(12) United States Patent
Brown, Jr.

(10) Patent No.: US 12,151,782 B2
(45) Date of Patent: Nov. 26, 2024

(54) SPROCKET WITH VARIABLE GEAR TOOTH VALLEY RADIUS

(71) Applicant: Douglas Gilman Brown, Jr., Shelby, NC (US)

(72) Inventor: Douglas Gilman Brown, Jr., Shelby, NC (US)

( * ) Notice: Subject to any disclaimer, the term of this patent is extended or adjusted under 35 U.S.C. 154(b) by 0 days.

(21) Appl. No.: 18/026,257

(22) PCT Filed: Sep. 20, 2021

(86) PCT No.: PCT/US2021/051032
§ 371 (c)(1),
(2) Date: Mar. 14, 2023

(87) PCT Pub. No.: WO2022/066553
PCT Pub. Date: Mar. 31, 2022

(65) Prior Publication Data
US 2023/0356803 A1    Nov. 9, 2023

Related U.S. Application Data

(60) Provisional application No. 63/198,002, filed on Sep. 23, 2020.

(51) Int. Cl.
*B62M 9/06* (2006.01)
*F16H 55/30* (2006.01)

(52) U.S. Cl.
CPC ............... *B62M 9/06* (2013.01); *F16H 55/30* (2013.01)

(58) Field of Classification Search
CPC ............ B62M 9/06; F16H 55/30; F16H 55/08
(Continued)

(56) References Cited

U.S. PATENT DOCUMENTS 4,526,558 A   7/1985  Durham
6,155,943 A * 12/2000  Ledvina .................. F16H 55/30
                                                       160/157
(Continued)

FOREIGN PATENT DOCUMENTS

DE        19626072 A1    1/1997
DE    102019128898 A1    5/2020
(Continued)

OTHER PUBLICATIONS

International Application No. PCT/US2021/051032, International Search Report and Written Opinion mailed Jan. 3, 2022, 12 pages.
(Continued)

*Primary Examiner* — Michael R Mansen
*Assistant Examiner* — Mark K Buse
(74) *Attorney, Agent, or Firm* — Kintner IP, LLC; Mary Frances Ludwig

(57) ABSTRACT

A sprocket having a gear tooth valley radius which varies around the sprocket perimeter provides additional gear torque multiplication to a rider, which is especially beneficial when climbing hills. In some embodiments, the sprocket is a bicycle chainring with reduced gear tooth valley radius over at least a portion of the chainring. In other embodiments, the sprocket is a bicycle rear wheel cassette cog with increased gear tooth valley radius over at least a portion of the cassette cog. Regions of both reduced and increased gear tooth valley radius may be present on a given sprocket. The sprocket valley floor surface may be rounded or may include N segments adjoined by N vertices. The segments of the valley floor surface may be curved or straight. The vertices of the valley floor surface may be curved or angled. Embodiments for bicycles and motorcycles are presented.

20 Claims, 7 Drawing Sheets

(58) Field of Classification Search
USPC .......................................................... 474/69
See application file for complete search history.

(56) References Cited

U.S. PATENT DOCUMENTS

| 10,584,785 | B2* | 3/2020 | Kamada | B62M 9/124 |
| 2006/0063624 | A1* | 3/2006 | Voss | B62M 9/105 |
| | | | | 474/78 |
| 2010/0151978 | A1* | 6/2010 | Todd | F16H 55/30 |
| | | | | 474/152 |
| 2019/0263473 | A1* | 8/2019 | Braedt | F16H 55/30 |
| 2020/0166113 | A1* | 5/2020 | Holic | F16H 7/06 |

FOREIGN PATENT DOCUMENTS

| EP | 3689731 A1 | 8/2020 |
| FR | 2213865 A1 | 8/1974 |

OTHER PUBLICATIONS

Friction-Producing Mechanisms of a Bicycle Chain, Friction Facts, LLC, May 13, 2014, https://zerofrictioncycling.com.au/wp-content/uploads/2020/06/Friction-Producing-Mechanisms.pdf.

Spreng Reng Analysis by Hunter Allen, Oct. 10, 2020, https://www.youtube.com/watch?v=AW5UgQlx4H8&t=1199s.

Spreng Reng 2.0—Can This Chainring Make You Climb Faster?, Chuck Pena, Dec. 3, 2022, https://pezcyclingnews.com/technspec/spreng-reng-2-0-pez-pre-production-product-preview/.

Patent Patrol: Spreng Reng's variable tooth valley radius changes gearing w/o changing teeth?, Dan Cavallari, Jul. 7, 2021, https://bikerumor.com/patent-patrol-spreng-rengs-variable-tooth-valley-radius-changes-gearing-w-o-changing-teeth/.

Spreng Reng returns for round two with Spreng Reng 2.0 Hexagon Chainring, Dan Cavallari, Mar. 10, 2021, https://bikerumor.com/spreng-reng-returns-for-round-two-with-spreng-reng-2-0-hexagon-chainring/.

\* cited by examiner

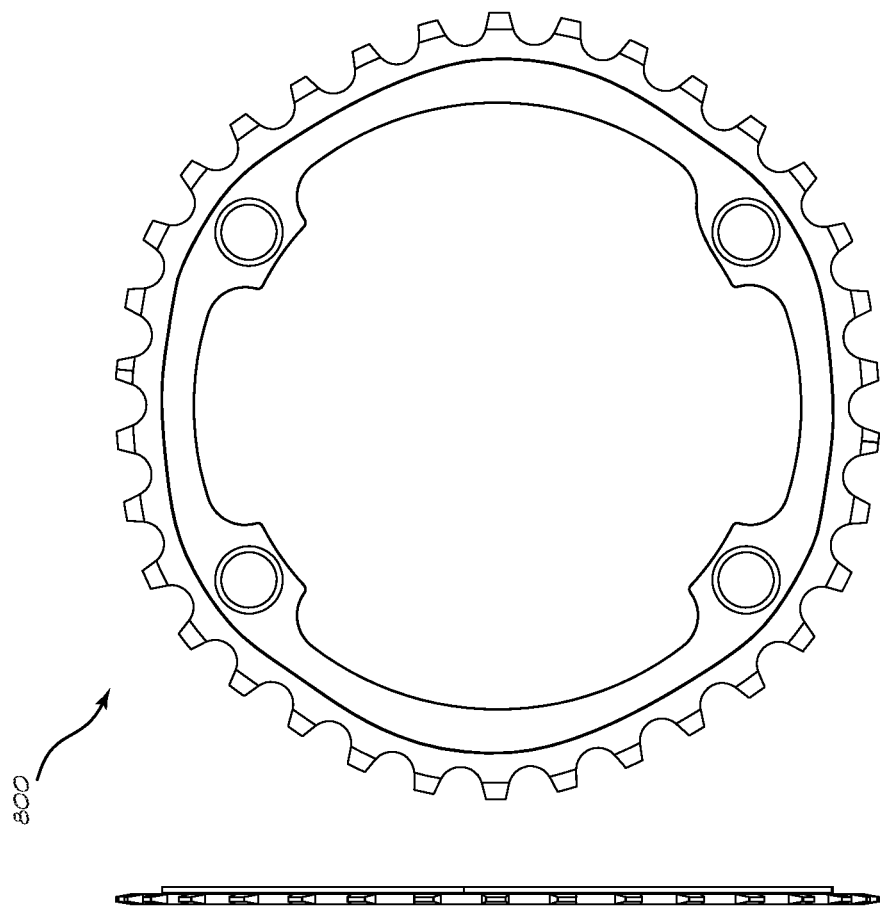
FIG. 9
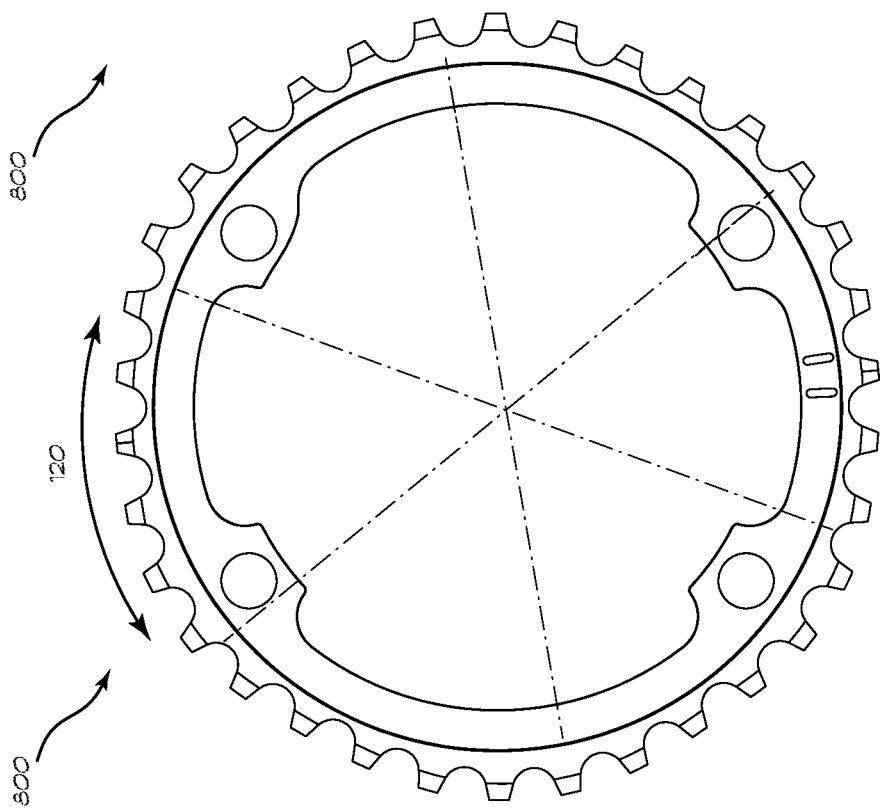
FIG. 10
FIG. 8

SPROCKET WITH VARIABLE GEAR TOOTH VALLEY RADIUS

CROSS-REFERENCE TO RELATED APPLICATION

This application is a non-provisional application and claims priority to U.S. provisional application No. 63/198,002, filed 23 Sep. 2020, which is incorporated by reference as if fully recited herein.

TECHNICAL FILED

The disclosed embodiments are generally in the field of drivetrain components for bicycles and motorcycles, and more specifically directed to a sprocket therefor.

BACKGROUND OF THE ART

Riding a bicycle long distances, at speed, against the wind, or climbing up steep, continuous hills can be both physically and mentally exhausting. In particular, climbing steep or long, continuous hills without any meaningful breaks (i.e. continually having to overcome the constant pull of gravity) is perhaps the most grueling, dreaded, fatigue inducing, and feared cycling discipline of them all. This is particularly true if you are not having a "good day" on the bike or are experiencing additional fatigue before a strenuous climb. Recently, with the availability of larger rear wheel bicycle sprockets (cassette cogs) and smaller front wheel bicycle sprockets (chainrings) which provide the rider with greater drivetrain gear torque multiplication, climbing has become somewhat of an easier discipline than in years past when available drivetrain gear ratios provided less gear torque multiplication. There is therefore a need in the art for mechanisms to provide an increase in gear torque multiplication beyond what is "typical" without any reduction in gear teeth, thereby providing an easier, higher pedaling cadence (rpm) and sustaining or maintaining the gear rollout (distance of forward motion for each pedal rotation) of the drivetrain thereby increasing speed while the rider expends the same or even less energy.

SUMMARY

The present disclosure teaches embodiments of a sprocket which has a gear tooth valley radius which varies around the sprocket perimeter. 'Sprocket' as used herein generally refers to a wheel with gear teeth, which is configured to engage a chain or a toothed belt. One type of sprocket is a chainring or chainwheel of a bicycle. Another type of sprocket is a rear wheel cassette cog of a bicycle. One skilled in the art will appreciate that this disclosure applies mutatis mutandis to a front or rear motorcycle sprocket.

To fully appreciate the invention's benefits, one must first understand the differences between climbing and other cycling disciplines. First, climbing is harder than riding on relatively flat terrain because the pull of gravity must be overcome by the rider. When climbing hills, the pull of gravity will always be felt, even more so the steeper or longer the climb or the heavier the bike or rider. An inherent problem with climbing is the inevitable fatigue that eventually affects everyone from attempting to overcome gravity's constant pull, one pedal stroke after another. A preferred technique to delay fatigue when climbing is to maintain a comfortable, sustainable cadence (i.e. revolutions per minute the crank arms, pedals, and feet are moving about in a circular manner within the entire pedal stroke). Pedaling with a fast yet sustainable cadence is also referred to as "spinning". When cadence decreases, as it almost always does within a strenuous climb, a rider's peak torque applied to the pedals will inherently increase. It is this increase in torque (through a slower cadence) which causes muscle fatigue to be greatly accelerated when climbing.

An analogy for the bio-mechanical effects of climbing is to consider cadence as akin to a specific resistance amount in weight training. At a certain resistance, one can comfortably complete many repetitions of without experiencing complete exhaustion. As resistance is increased (e.g., by adding weight to a barbell) one is able to complete fewer repetitions before exhaustion. This is caused by the increased effort required to overcome the added resistance. If a bike rider outputs a given power, when cadence slows down the torque applied to the pedals increases. This increase in torque output by the rider to keep the bike moving forward through a slower cadence is responsible for greatly accelerating fatigue. Furthermore, a decrease in cadence perpetuates a further increase in fatigue, essentially creating a "snowball effect" until exhaustion.

Thus, an important benefit of the disclosed sprocket is easier and faster climbing through the use of a beneficial increase in gear torque multiplication without any reduction or increase in the number of gear teeth.

In an exemplary configuration, the sprocket engages with a cooperating chain having a plurality of chain rollers, each of the chain rollers separated by a distance of a chain pitch. The sprocket includes a plurality of gear teeth, wherein a count of all of the plurality of gear teeth is a gear tooth number; a plurality of gear tooth valleys, wherein each of the gear tooth valleys is disposed between two adjacent gear teeth of the plurality of gear teeth; and each gear tooth valley has a valley floor at a point nearest an axis of rotation of the sprocket, and a gear tooth valley radius measured from the axis of rotation to the valley floor. The sprocket has a nominal valley radius proportional to the product of the chain pitch and the gear tooth number. The plurality of gear tooth valleys includes: a first set of gear tooth valleys including one or several adjacent gear tooth valleys having a reduced gear tooth valley radius which is less than the nominal valley radius; a second set of gear tooth valleys including one or several adjacent gear tooth valleys having an increased gear tooth valley radius which is greater than or equal to the nominal valley radius; the first set of gear tooth valleys is circumferentially offset from the second set of gear tooth valleys; and at least three of the first set of gear tooth valleys are included and circumferentially offset from one another.

In another exemplary configuration, the sprocket engages with a cooperating chain having a plurality of chain rollers, each of the chain rollers separated by a distance of a chain pitch. The sprocket includes a plurality of gear teeth, wherein a count of all of the plurality of gear teeth is a gear tooth number; a plurality of gear tooth valleys, wherein each of the gear tooth valleys is disposed between two adjacent gear teeth of the plurality of gear teeth; and each gear tooth valley has a valley floor at a point nearest an axis of rotation of the sprocket, and a gear tooth valley radius measured from the axis of rotation to the valley floor. The sprocket has a nominal valley radius proportional to the product of the chain pitch and the gear tooth number. The plurality of gear tooth valleys includes: a first set of gear tooth valleys including one or several adjacent gear tooth valleys having an increased gear tooth valley radius which is greater than the nominal valley radius; a second set of gear tooth valleys including one or several adjacent gear tooth valleys having a reduced gear tooth valley radius which is less than or equal to the nominal valley radius; the first set of gear tooth valleys is circumferentially offset from the second set of gear tooth valleys; and at least three of the first set of gear tooth valleys are included and circumferentially offset from one another.

In embodiments, the first and second sets of gear tooth valleys together define a pattern core, and the pattern core repeats circumferentially at least three times.

In embodiments, an imaginary valley floor surface near the perimeter of the sprocket passes through each of the valley floors and includes N segments adjoined by N vertices. Each of the N segments is defined by the first set of gear tooth valleys, and each of the N vertices is defined by the second set of gear tooth valleys. In some embodiments, N is a number from five to fourteen, inclusive. In some embodiments, each of the N segments is curved. In some embodiments, each of the N vertices is curved. In some embodiments, each of the N segments is straight. In some embodiments, each of the N vertices is angled.

In some embodiments, the valley floor surface has a rounded shape.

Other embodiments, in addition to the embodiments enumerated above, will become apparent from the following detailed description, taken in conjunction with the accompanying drawings, which illustrate, by way of example, the principles of the sprocket and systems having such a sprocket.

BRIEF DESCRIPTION OF THE DRAWINGS

Non-limiting and non-exhaustive embodiments of the sprocket are described with reference to the following figures, wherein like reference numerals refer to like parts throughout the various views unless otherwise specified.

FIG. 8 is a side view of another embodiment of a sprocket suitable as a bicycle chainring.

FIG. 9 is an opposing side view of the FIG. 8 embodiment.

FIG. 10 is an end view of the FIG. 8 embodiment.

Figure 1:
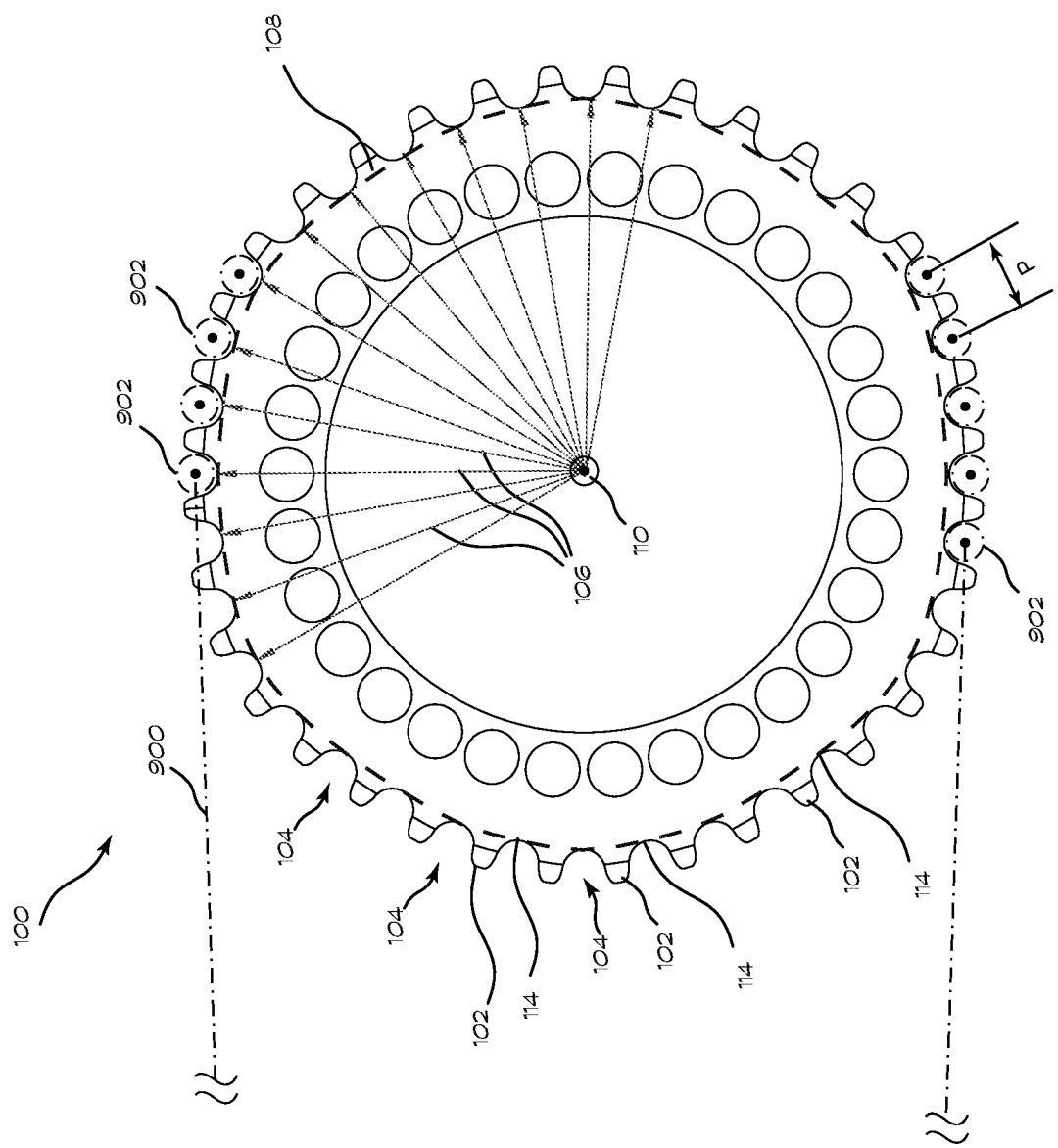
FIG. 1 is a side view of an embodiment of a sprocket suitable as a bicycle chainring.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

LIST OF DRAWING REFERENCE NUMERALS 100 sprocket
102 gear tooth
104 gear tooth valley
106 gear tooth valley radius
108 valley floor surface
110 axis of rotation
114 valley floor
116 first set of gear tooth valleys
118 second set of gear tooth valleys
120 section
300 sprocket (additional embodiment)
400 sprocket (additional embodiment)
500 sprocket (additional embodiment)
600 sprocket (additional embodiment)
700 sprocket (additional embodiment)
800 sprocket (additional embodiment)
900 chain
902 chain roller
P chain pitch

DETAILED DESCRIPTION

Referring initially to FIG. 1, there is illustrated an embodiment of a sprocket, generally designated 100, having a variable gear tooth valley radius 106. The shown embodiment has 36 gear teeth; each gear tooth is designated 102. This embodiment is particularly suitable as a bicycle chainring. The regions in between gear teeth 102 are referred to as gear tooth valleys 104, and are configured to engage with chain rollers 902 of a chain 900, for example a bicycle chain (shown in dot-dashed lines). The point of each gear tooth valley 104 nearest the axis of rotation 110 of the sprocket is referred to herein as the valley floor 114. A valley floor surface 108 of sprocket 100 is indicated in dashed lines. The valley floor surface corresponds to the imaginary surface near the perimeter of the sprocket which passes through each valley floor of the sprocket. On a typical circular chainring, the valley floor surface described by the constant gear tooth valley radius is a circle, and may be referred to as the valley floor circle.

Each gear tooth valley 104 has a gear tooth valley radius 106 which is measured from axis of rotation 110 to valley floor 114 of that gear tooth valley. Sprocket 100 has a variable gear tooth valley radius around the perimeter. By way of comparison, a typical circular chainring having 36 gear teeth, and configured for use with a chain having a chain pitch 'P' (half of the distance between three adjacent chain rollers, as measured from the mechanical center of the chain rollers, generally where a rivet is located) of 12.7 mm (0.5 inch), has a constant gear tooth valley radius of about 68.86 mm. Sprocket 100, which also has 36 gear teeth, has gear tooth valley radii 106 which may vary between being less than 68.86 mm, greater than 68.86 mm, or about 68.86 mm.

When reference is made herein to an increase or decrease in gear tooth valley radius, the comparison is with respect to the gear tooth valley radius measurement for a typical circular bicycle sprocket (i.e. chainring or cassette cog) having the same number of gear teeth as the referenced embodiment.

The term 'bicycle' is used to apply to racing bikes, gravel bikes, mountain bikes (full suspension or hard tail), cross country bikes, trail bikes, fat tire bikes, city bikes, cruiser bikes, triathlon bikes, time trial bikes, hybrid bikes, road bikes, urban bikes, commuter bikes, track bikes, youth bikes, fixed gear bikes, 1× or 'one-by' bikes, partially or fully electric powered bicycles or scooters, cyclocross bikes, and the like.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used in this application, the term "about" refers to a range of values within plus or minus 0.25% of the specified number.

Figure 2:
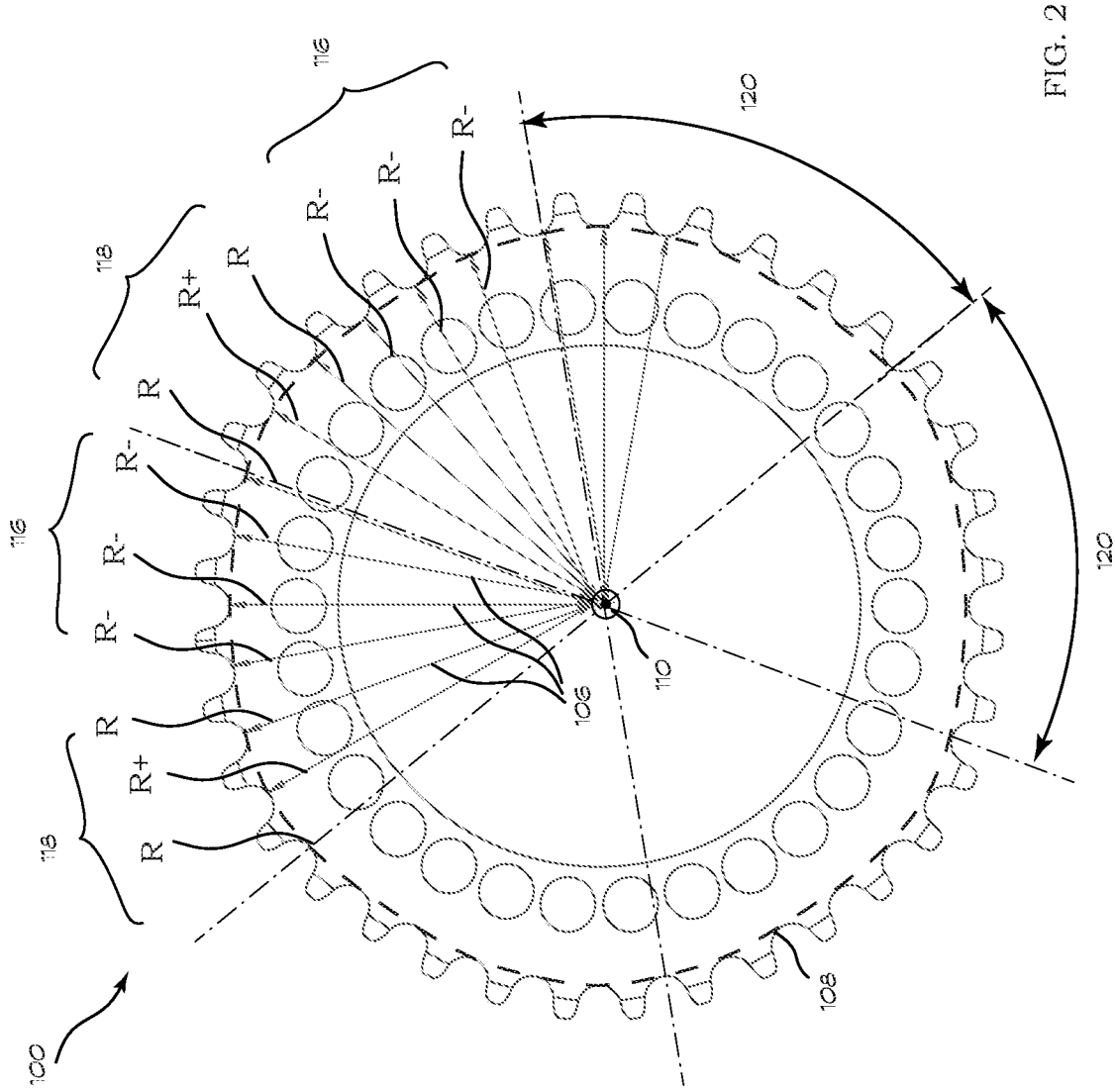
FIG. 2 is a side view of an embodiment of a sprocket illustrating an irregular valley floor surface.

In FIG. 2, gear tooth valley radii 106 of sprocket 100 are labeled R, R−, or R+. The label R indicates a gear tooth valley radius which is about equal to that of a round chainring having the same number of gear teeth, also referred to herein as the nominal valley radius. For a 36 gear tooth example, such as sprocket 100, a gear tooth valley radius labeled 'R' may be in the range of 68.86 mm+/− 0.25%, or may be equal to 68.86 mm. The nominal valley radius is proportional to the product of the chain pitch and number of gear teeth (i.e. a count of all gear teeth of the sprocket, also referred to as the gear tooth number); in other words, the nominal valley radius is proportional to the circumference of a circular chainring having the same gear tooth number.

The label R− indicates a decreased gear tooth valley radius relative to the nominal valley radius. For the 36 gear tooth example, a gear tooth valley radius labeled 'R−' may measure, for example, 68.5 mm, 67.8 mm, 67.6 mm or less. The label R+ indicates an increased gear tooth valley radius relative to the nominal valley radius. For the 36 gear tooth example, a gear tooth valley radius labeled 'R+' may measure, for example, 69.25 mm, 69.5 mm, 69.75 mm or more.

While the labels R− or R+ may be applied to multiple gear tooth valley radii for a given sprocket, not all radii with a common label necessarily have an equal value. For example, three gear tooth valley radii labeled R− may have different radii of 68.0 mm, 67.9 mm, and 67.8 mm. In another example, three gear tooth valley radii labeled R+ may have different radii of 69.3 mm, 69.5 mm, and 69.7 mm. In some cases, some or all of the radii with a common label may have an equal value.

In the embodiment of FIGS. 1 & 2, gear tooth valley radii 106 are reduced over portions of the chainring, indicated R−. When chain 900 is engaged with the chainring within the regions of reduced gear tooth valley radius, the effect perceived by the rider is similar to shifting to a gear of slightly smaller radius, in that they may comfortably increase their pedaling cadence (commonly, pedal revolutions per minute). An important benefit of the design is that increased pedaling cadence will increase the speed at which the bicycle moves forward, without the need for a reduction in gear tooth count to provide additional gear torque multiplication.

In the shown embodiment, sprocket 100 has a first set of gear tooth valleys 116, including several adjacent gear tooth valleys each having a reduced gear tooth valley radius 106 which is less than the nominal valley radius, R. As shown in FIG. 2, first set of gear tooth valleys 116 includes three gear tooth valleys having a radius R−. In other embodiments, first set of gear tooth valleys 116 may include one gear tooth valley or two or another number of adjacent gear tooth valleys. Sprocket 100 also has a second set of gear tooth valleys 118, including several adjacent gear tooth valleys each having an increased gear tooth valley radius 106 which is greater than or equal to the nominal valley radius, R. As shown in FIG. 2, second set of gear tooth valleys 118 includes three consecutive gear tooth valleys having radii of R, R+, R. In other embodiments, second set of gear tooth valleys 118 may include one gear tooth valley or two or another number of adjacent gear tooth valleys.

First set of gear tooth valleys 116 and second set of gear tooth valleys 118 may repeat multiple times around the sprocket. In the embodiment of FIG. 2, first set of gear tooth valleys 116 is circumferentially offset from second set of gear tooth valleys 118. In the shown embodiment, the plurality of gear tooth valleys 104 includes a pattern of first set of gear tooth valleys 116 (regions of R−) alternating with second set of gear tooth valleys 118 (one or more radii designated R or R+). In some embodiments, at least three of first set of gear tooth valleys 116 are present, and are circumferentially offset from one another around the perimeter of the sprocket.

As best seen in FIG. 2, sprocket 100 has a valley floor surface 108 which includes six segments adjoined by six vertices and approximates a hexagonal shape. Any approximately polygonal shape as described herein may have curved segments or sides, rather than straight sides, or curved vertices between the segments, rather than angled vertices. Alternatively, an approximately polygonal shape as described herein may have straight segments or sides, or may have angled vertices between the segments. The dot-dash lines shown bisecting the chainring divide it into six sections 120. In this example, each section 120 includes a segment defined by first set of gear tooth valleys 116 and a vertex defined by second set of gear tooth valleys 118. A gear tooth valley radius pattern core of "R, R+, R, R−, R−, R−" repeats six times around the chainring, with one repetition of the pattern core corresponding to each section 120.

There are several beneficial effects of providing regions of reduced gear tooth valley radius (first set of gear tooth valleys 116) alternating with one or more gear tooth valleys of increased gear tooth valley radius (second set of gear tooth valleys 118). First, second set of gear tooth valleys 118 helps to take up chain slack produced by the chain interfacing with first set of gear tooth valleys 116. Such a configuration ensures that the chain engages properly around the entire perimeter of the sprocket, and avoids incorrect chain engagement problems, such as skipping, or preventing the chain rollers from fully engaging within each gear tooth valley 104 (which may inadvertently cause the drivetrain to behave as if a typical circular sprocket were engaged, thereby defeating the objectives of the design). Second, the increased gear tooth valley radius of the second set of gear tooth valleys (which may be over just a single gear tooth valley) briefly has a similar effect as shifting to a gear of slightly larger radius where the rider does not change their cadence. In this scenario the bicycle will move forward at a higher speed, giving the rider the feeling of a slight acceleration. Third, alternating between decreased and increased gear tooth valley radius causes a rounding of the shape of the valley floor surface, which provides a smooth pedal stroke that is highly desirable for a non-round chainring.

In other embodiments, the gear tooth valley radius may vary in a pattern which repeats around the perimeter of the sprocket more or fewer than six times. Such configurations may result in a valley floor surface which approximates a polygonal shape other than the approximately hexagonal shape shown in FIGS. 1-2. For example, a sprocket having an approximately octagonal valley floor surface may have a pattern of gear tooth valley radius variation in which the pattern core repeats eight times; a sprocket having an approximately decagonal valley floor surface may have a pattern of gear tooth valley radius variation in which the pattern core repeats ten times; a sprocket having a valley floor surface approximating an n-sided polygon may have a pattern of gear tooth valley radius variation in which the pattern core repeats n times. A pattern which repeats frequently (i.e., has a high number 'N' of segments and vertices) may be desirable for a high gear tooth count sprocket, as it may provide a rounded feel to the sprocket and therefore a smoother pedal stroke. While embodiments discussed may include an even number of pattern core repetitions or an approximately polygonal surface having an even number of sides, the same principles may be applied to sprockets having an odd number of pattern core repetitions or approximately polygonal surfaces having an odd number of sides.

Each pattern core may include several gear tooth valleys with increased radius R+ and several with decreased radius R−. Exemplary pattern cores include "R−, R+"; "R−, R−, R+"; "R+, R−, R−, R+"; "R+, R−, R−, R−, R+"; and so on, which repeat around the sprocket a number of times suitable for the gear tooth count.

Figure 4:
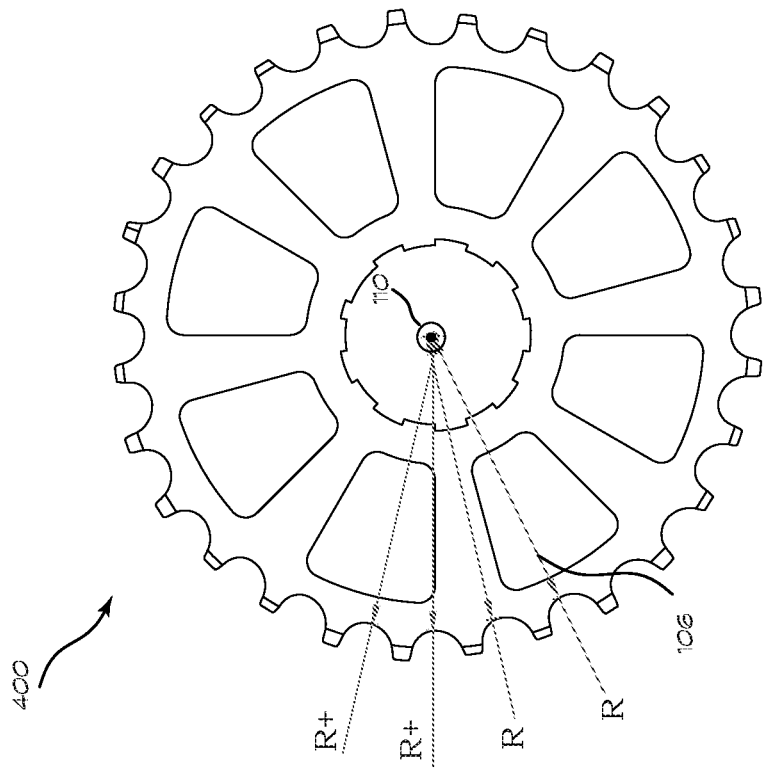
FIG. 4 is a side view of another embodiment of a sprocket suitable as a bicycle cassette cog.
Figure 3:
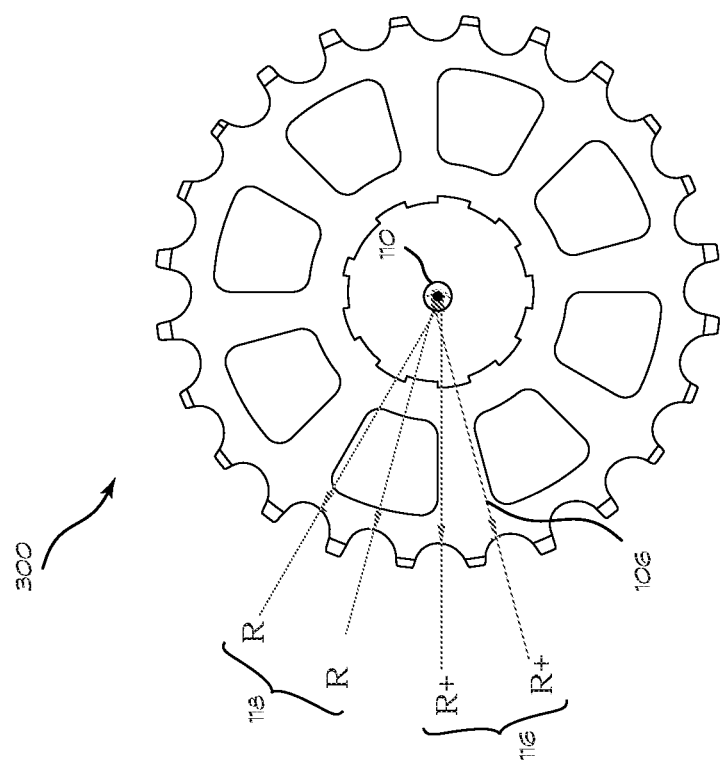
FIG. 3 is a side view of another embodiment of a sprocket suitable as a bicycle cassette cog.

Referring now to FIGS. 3 & 4, there are illustrated embodiments of sprockets 300 & 400 for use as a rear wheel cassette cog of a bicycle. In embodiments for use as cassette cogs, an increase in gear tooth valley radius 106 over a portion of the cassette cog (labeled R+) provides the benefit of additional gear torque multiplication, allowing the rider to comfortably increase their cadence, thereby increasing the speed at which the bicycle moves forward. As discussed above, the pedaling cadence has increased (compared to a circular cassette cog with the same number of teeth) while the gear tooth count remains fixed, which inherently increases speed. Sprocket 300 of FIG. 3 has 24 gear teeth and sprocket 400 of FIG. 4 has 28 gear teeth. Each sprocket 300, 400 has a gear tooth valley radius 106 which varies in a pattern around the perimeter of the sprocket. The pattern core for these embodiments is "R, R, R+, R+".

Other patterns of gear tooth valley radius may be used, for example, a first set of gear tooth valleys 116 with between 1-3 gear tooth valleys each having an increased gear tooth valley radius (R+) which is greater than the nominal valley radius, R, may alternate with a second set of gear tooth valleys 118 including between 1-3 gear tooth valleys having reduced gear tooth valley radius (R− or R) which is less than or equal to the nominal valley radius.

Figure 6:
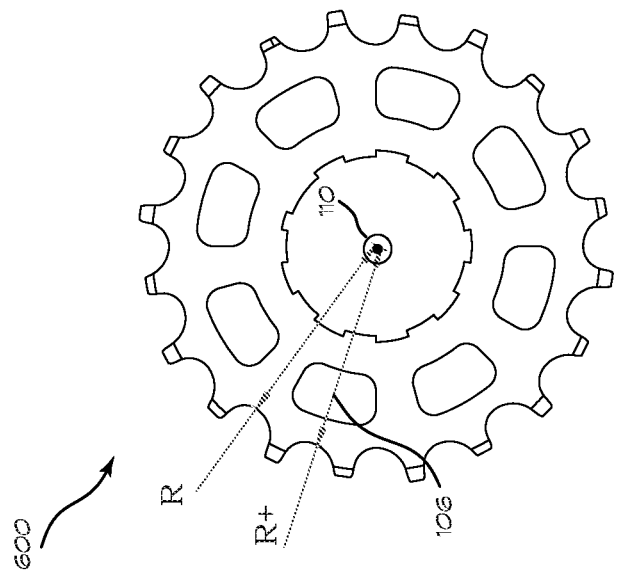
FIG. 6 is a side view of another embodiment of a sprocket suitable as a bicycle cassette cog.
Figure 5:
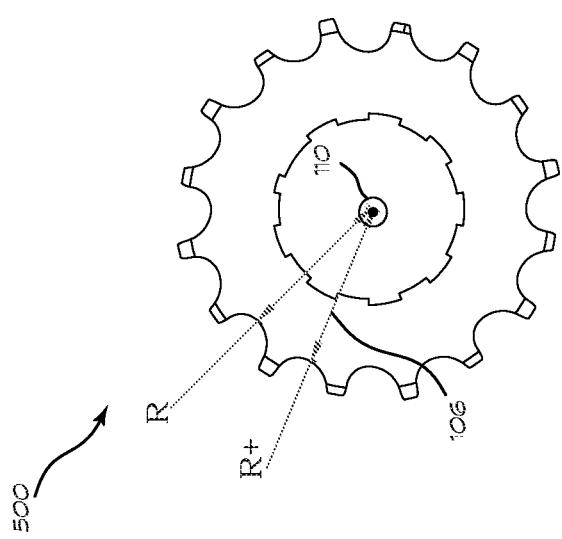
FIG. 5 is a side view of another embodiment of a sprocket suitable as a bicycle cassette cog.

FIGS. 5 & 6 illustrate additional embodiments, where sprockets 500 and 600, respectively, are designed as rear wheel cassette cogs of a bicycle. Sprocket 500 of FIG. 5 has 16 gear teeth and sprocket 600 of FIG. 6 has 20 gear teeth. Each sprocket 500, 600 has a gear tooth valley radius 106 which varies in a pattern around the perimeter of the sprocket. The pattern core for these embodiments is "R, R+".

Figure 7:
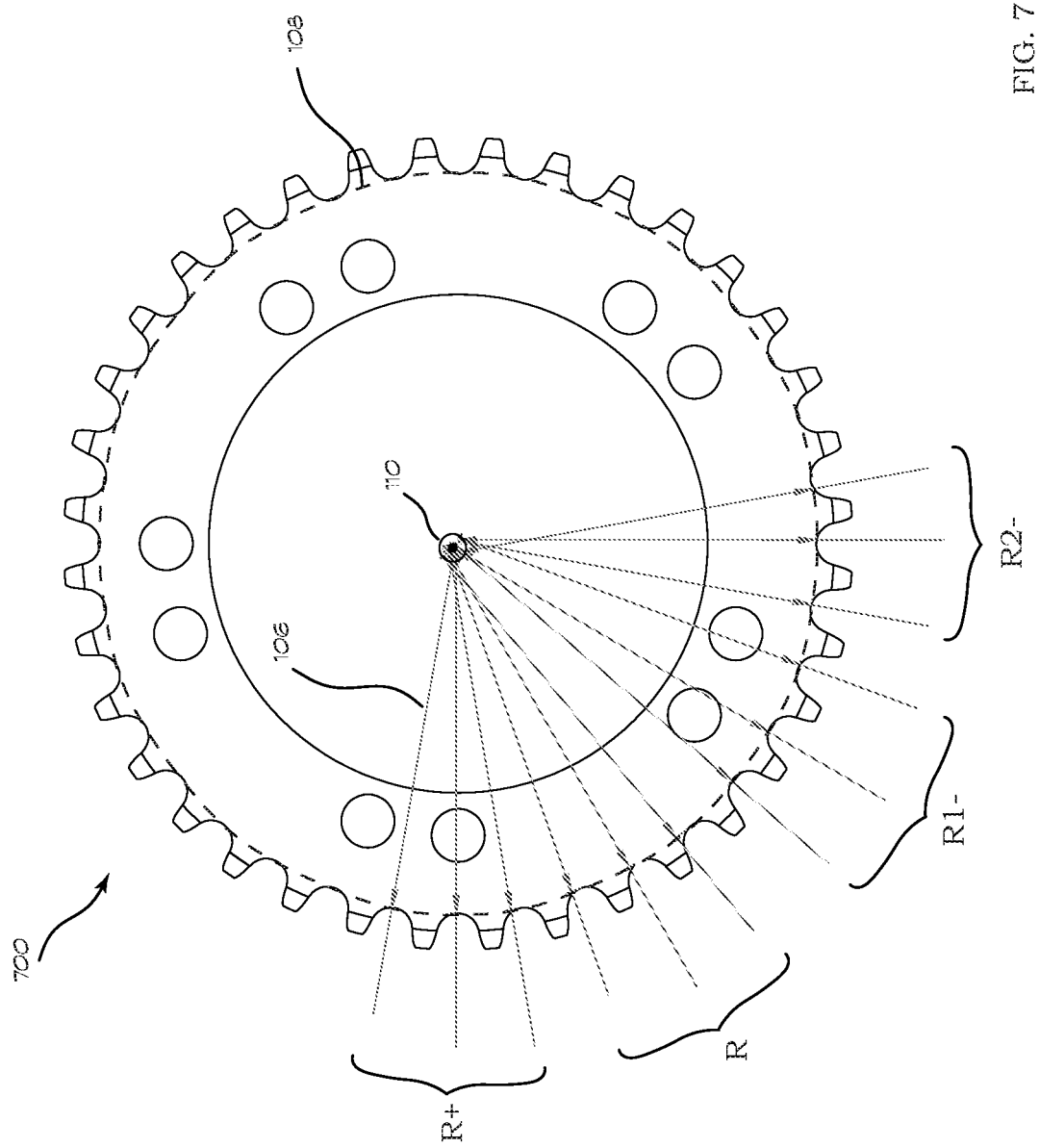
FIG. 7 is a side view of another embodiment of a sprocket suitable as a bicycle chainring.

FIG. 7 shows another embodiment of a sprocket, 700, suitable as a bicycle chainring. The shown embodiment has 36 gear teeth. Valley floor surface 108 of sprocket 700 is rounded. Gear tooth valley radii 106 vary in a pattern around the perimeter of sprocket 700; the shown pattern is three of R+, three of R, three of a constant reduced radius R1−, and three of another constant reduced radius R2−. In another example pattern one or more of the groups of three like radii are replaced with a group of two like radii. In another example pattern, radii measuring R are replaced with radii measuring R+. R+ radii may be the same or different between these two groups, for example a pattern of "R1−, R1−, R2−, R2−, R3+, R3+, R4+, R4+" may be used. These patterns may be adapted as desirable for machining purposes or to achieve a smoother full revolution.

Figure 11:
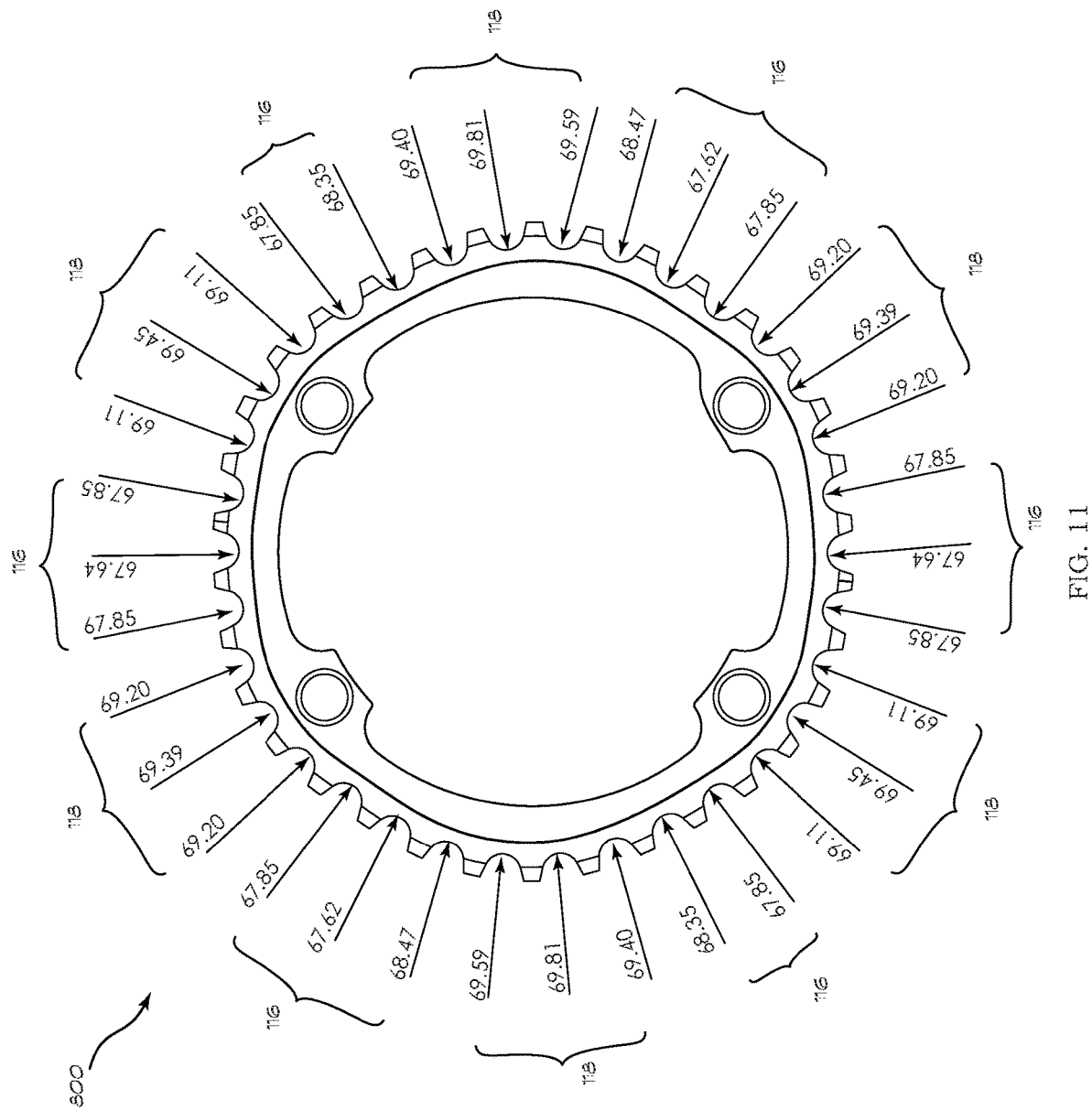
FIG. 11 is the opposing side view of the FIG. 8 embodiment, illustrating variable gear tooth valley radius.

FIGS. 8-10 are first side, opposing side, and end views, respectively, of another embodiment of a sprocket, 800, suitable as a bicycle chainring. The shown embodiment has 34 gear teeth. Six sections 120 are present in this embodiment, as shown separated by the dot-dash lines of FIG. 8. FIG. 11 illustrates variable gear tooth valley radius of the embodiment, and provides exemplary radius dimensions (values given in millimeters). This chainring includes six of first set of gear tooth valleys 116 alternating with six of second set of gear tooth valleys 118. It can be seen that the radius values within each of the sets 116, 118 are not the same as one another. In addition, the number of radii within each set may vary (some are shown with two radii and some with three radii). In this embodiment, the gear tooth valley radii describe an approximately hexagonal shape, as indicated by the perimeter of the rear face visible in FIGS. 9 & 11. The six segments of this approximate hexagon are in the region of each first set of gear tooth valleys 116; the six vertices are in the region of each second set of gear tooth valleys 118.

It will be appreciated that embodiments of a chainring may be rotationally aligned with respect to the crankarms through numerous different mounting hole configurations, allowing the sprocket positioning to be optimized for a rider's pedal stroke. To this end, indicia may be engraved or otherwise marked on a face of the sprocket, to facilitate correct installation.

While embodiments discussed herein disclose sprockets with an even number of gear teeth, similar principles may be applied to sprockets with an odd number of gear teeth.

Further provided is a sprocket assembly having one or more sprockets according to the embodiments discussed herein. For example, the sprocket assembly may be a bicycle cassette having 2-14 cogs, or more than 14 cogs, where one or more of the embodiments of FIGS. 3-6 are included.

The sprocket assembly may be a bicycle crankset having two or three chainrings, where any of the embodiments of FIG. 1, 2, 7, or 8-11 are included. The sprocket assembly may be a bicycle crankset having three chainrings of different gear tooth counts, where more than one of the chainrings has a variable gear tooth valley radius.

Further provided is a bicycle having at least one sprocket (chainring or cassette cog) having variable gear tooth valley radius. Further provided is a bicycle having at least one chainring having variable gear tooth valley radius and at least one rear wheel cassette cog having variable gear tooth valley radius.

Further provided is a motorcycle having at least one sprocket (front or rear) having variable gear tooth valley radius. For a motorcycle transmission output countershaft mounted front sprocket, a reduction in the radius of any gear tooth valley provides an increase in gear torque multiplication and an increase in radius of any gear tooth valley provides a decrease in gear torque multiplication. For a motorcycle rear wheel sprocket, an increase in the tooth valley radius provides an increase in gear torque multiplication and a decrease in tooth valley radius provides a decrease in gear torque multiplication.

The embodiments of the sprocket described herein are exemplary and numerous modifications, combinations, variations, and rearrangements can be readily envisioned to achieve an equivalent result. Further, nothing in the above-provided discussions of the sprocket should be construed as limiting the invention to a particular embodiment or combination of embodiments.

What is claimed is:

1. A sprocket configured to engage with a cooperating chain having a plurality of chain rollers, each of the chain rollers separated by a distance of a chain pitch, the sprocket comprising:
   a plurality of gear teeth, a count of all of the plurality of gear teeth being a gear tooth number;
   a plurality of gear tooth valleys, each of the gear tooth valleys being disposed between two adjacent gear teeth of the plurality of gear teeth and configured to engage with one of the plurality of chain rollers;
   each gear tooth valley having a valley floor at a point nearest an axis of rotation of the sprocket, and a gear tooth valley radius measured from the axis of rotation to the valley floor;
   wherein the sprocket has a nominal valley radius proportional to a product of multiplying the chain pitch and the gear tooth number; and
   wherein the plurality of gear tooth valleys includes:
      a first set of gear tooth valleys comprising a plurality of adjacent gear tooth valleys each having a gear tooth valley radius and including several adjacent gear tooth valleys having a reduced gear tooth valley radius which is less than the nominal valley radius;
      a second set of gear tooth valleys, different from the first set of gear tooth valleys, comprising a plurality of adjacent gear tooth valleys each having a gear tooth valley radius and including several adjacent gear tooth valleys having an increased gear tooth valley radius which is greater than or equal to the nominal valley radius;
      the first set of gear tooth valleys being circumferentially offset from the second set of gear tooth valleys;
      at least three of the first set of gear tooth valleys are included and circumferentially offset from one another;
      wherein the first set of gear tooth valleys and the second set of gear tooth valleys together define a pattern core, and the pattern core repeats circumferentially at least three times; and
      wherein the gear tooth valley radii of the gear tooth valleys in the second set of gear tooth valleys are equal.

2. The sprocket of claim 1, wherein the gear tooth valley radii of the gear tooth valleys in the first set of gear tooth valleys are equal.

3. The sprocket of claim 1, wherein the first set of gear tooth valleys and the second set of gear tooth valleys are present in an equal number, the equal number being from five to fourteen, inclusive.

4. A bicycle having a sprocket assembly including the sprocket of claim 1.

5. A motorcycle having a sprocket assembly including the sprocket of claim 1.

6. A sprocket configured to engage with a cooperating chain having a plurality of chain rollers, each of the chain rollers separated by a distance of a chain pitch, the sprocket comprising:
   a plurality of gear teeth, a count of all of the plurality of gear teeth being a gear tooth number;
   a plurality of gear tooth valleys, each of the gear tooth valleys being disposed between two adjacent gear teeth of the plurality of gear teeth and configured to engage with one of the plurality of chain rollers;
   each gear tooth valley having a valley floor at a point nearest an axis of rotation of the sprocket, and a gear tooth valley radius measured from the axis of rotation to the valley floor;
   wherein the sprocket has a nominal valley radius proportional to a product of multiplying the chain pitch and the gear tooth number; and
   wherein the plurality of gear tooth valleys includes:
      a first set of gear tooth valleys comprising a plurality of adjacent gear tooth valleys each having a gear tooth valley radius and including several adjacent gear tooth valleys having an increased gear tooth valley radius which is greater than the nominal valley radius;
      a second set of gear tooth valleys, different from the first set of gear tooth valleys, comprising a plurality of adjacent gear tooth valleys each having a gear tooth valley radius and including several adjacent gear tooth valleys having a reduced gear tooth valley radius which is less than or equal to the nominal valley radius;
      the first set of gear tooth valleys being circumferentially offset from the second set of gear tooth valleys;
      at least three of the first set of gear tooth valleys are included and circumferentially offset from one another;
      wherein the first set of gear tooth valleys and second set of gear tooth valleys together define a pattern core, and the pattern core repeats circumferentially at least three times; and
      wherein the gear tooth valley radii of each of the gear tooth valleys in the second set of gear tooth valleys are equal.

7. The sprocket of claim 6, wherein the gear tooth valley radii of each of the gear tooth valleys in the first set of gear tooth valleys are equal.

8. The sprocket of claim 6, wherein the first set of gear tooth valleys and the second set of gear tooth valleys are present in an equal number, the equal number being from five to fourteen, inclusive.

9. A motorcycle having a sprocket assembly including the sprocket of claim 6.

10. A bicycle having a sprocket assembly including the sprocket of claim 6.

11. A sprocket configured to engage with a cooperating chain having a plurality of chain rollers, each of the chain rollers separated by a distance of a chain pitch, the sprocket comprising:
   a plurality of gear teeth, a count of all of the plurality of gear teeth being a gear tooth number;
   a plurality of gear tooth valleys, each of the gear tooth valleys being disposed between two adjacent gear teeth of the plurality of gear teeth and configured to engage with one of the plurality of chain rollers;
   each gear tooth valley having a valley floor at a point nearest an axis of rotation of the sprocket, and a gear tooth valley radius measured from the axis of rotation to the valley floor;
   wherein the sprocket has a nominal valley radius proportional to a product of multiplying the chain pitch and the gear tooth number; and
   wherein the plurality of gear tooth valleys includes:
      a first set of gear tooth valleys comprising a plurality of adjacent gear tooth valleys each having a gear tooth valley radius and including several adjacent gear tooth valleys having a reduced gear tooth valley radius which is less than the nominal valley radius;

a second set of gear tooth valleys, different from the first set of gear tooth valleys, comprising a plurality of adjacent gear tooth valleys each having a gear tooth valley radius and including several adjacent gear tooth valleys having an increased gear tooth valley radius which is greater than or equal to the nominal valley radius;

the first set of gear tooth valleys being circumferentially offset from the second set of gear tooth valleys;

at least three of the first set of gear tooth valleys are included and circumferentially offset from one another;

wherein the first set of gear tooth valleys and the second set of gear tooth valleys together define a pattern core, and the pattern core repeats circumferentially at least three times; and wherein the gear tooth valley radii of the gear tooth valleys in the first set of gear tooth valleys are not equal.

12. The sprocket of claim 11, wherein the first set of gear tooth valleys and the second set of gear tooth valleys are present in an equal number, the equal number being from five to fourteen, inclusive.

13. A bicycle having a sprocket assembly including the sprocket of claim 11.

14. A motorcycle having a sprocket assembly including the sprocket of claim 11.

15. The sprocket of claim 11, wherein the gear tooth valley radii of the gear tooth valleys in the first set second set of gear tooth valleys are not equal.

16. A sprocket configured to engage with a cooperating chain having a plurality of chain rollers, each of the chain rollers separated by a distance of a chain pitch, the sprocket comprising:

a plurality of gear teeth, a count of all of the plurality of gear teeth being a gear tooth number;

a plurality of gear tooth valleys, each of the gear tooth valleys being disposed between two adjacent gear teeth of the plurality of gear teeth and configured to engage with one of the plurality of chain rollers;

each gear tooth valley having a valley floor at a point nearest an axis of rotation of the sprocket, and a gear tooth valley radius measured from the axis of rotation to the valley floor;

wherein the sprocket has a nominal valley radius proportional to a product of multiplying the chain pitch and the gear tooth number; and wherein the plurality of gear tooth valleys includes:

a first set of gear tooth valleys comprising a plurality of adjacent gear tooth valleys each having a gear tooth valley radius and including several adjacent gear tooth valleys having an increased gear tooth valley radius which is greater than the nominal valley radius;

a second set of gear tooth valleys, different from the first set of gear tooth valleys, comprising a plurality of adjacent gear tooth valleys each having a gear tooth valley radius and including several adjacent gear tooth valleys having a reduced gear tooth valley radius which is less than or equal to the nominal valley radius;

the first set of gear tooth valleys being circumferentially offset from the second set of gear tooth valleys;

at least three of the first set of gear tooth valleys are included and circumferentially offset from one another;

wherein the first set of gear tooth valleys and second set of gear tooth valleys together define a pattern core, and the pattern core repeats circumferentially at least three times; and wherein the gear tooth valley radii of the gear tooth valleys in the first set of gear tooth valleys are not equal.

17. The sprocket of claim 16, wherein the gear tooth valley radii of the gear tooth valleys in the second set of gear tooth valleys are not equal.

18. The sprocket of claim 16, wherein the first set of gear tooth valleys and the second set of gear tooth valleys are present in an equal number, the equal number being from five to fourteen, inclusive.

19. A motorcycle having a sprocket assembly including the sprocket of claim 16.

20. A bicycle having a sprocket assembly including the sprocket of claim 16.

* * * * *